(12) United States Patent
Higashiyama

(10) Patent No.: US 8,869,926 B2
(45) Date of Patent: Oct. 28, 2014

(54) FUEL SUPPLY STRUCTURE OF SADDLE-RIDE TYPE VEHICLE

(71) Applicant: Honda Motor Co., Ltd., Tokyo (JP)

(72) Inventor: Junji Higashiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/847,177

(22) Filed: Mar. 19, 2013

(65) Prior Publication Data

US 2013/0248270 A1   Sep. 26, 2013

(30) Foreign Application Priority Data

Mar. 22, 2012  (JP) ................................. 2012-065928

(51) Int. Cl.
*B62J 37/00*   (2006.01)

(52) U.S. Cl.
CPC ..................................... *B62J 37/00* (2013.01)
USPC ......................................................... 180/219

(58) Field of Classification Search
USPC ................................................. 180/219, 229
See application file for complete search history.

(56) References Cited

U.S. PATENT DOCUMENTS

| | | | | |
|---|---|---|---|---|
| 4,660,854 | A * | 4/1987 | Suzuki et al. .................. | 280/782 |
| 6,626,155 | B1 * | 9/2003 | Ueda et al. ..................... | 123/509 |
| 8,371,270 | B2 * | 2/2013 | Ishii ............................. | 123/510 |
| 2005/0103548 | A1 * | 5/2005 | Kudo ............................ | 180/219 |
| 2005/0263334 | A1 * | 12/2005 | Okabe et al. .................. | 180/219 |
| 2006/0066092 | A1 * | 3/2006 | Miyabe ......................... | 280/833 |
| 2008/0121455 | A1 * | 5/2008 | Ishida ........................... | 180/219 |
| 2008/0210203 | A1 * | 9/2008 | Sugiyama ..................... | 123/509 |
| 2008/0223642 | A1 * | 9/2008 | Shiraishi ....................... | 180/219 |
| 2009/0152038 | A1 * | 6/2009 | Nakamura et al. ............ | 180/219 |
| 2009/0166120 | A1 * | 7/2009 | Okamoto ...................... | 180/229 |
| 2009/0242304 | A1 * | 10/2009 | Tahara et al. ................. | 180/219 |
| 2010/0025140 | A1 * | 2/2010 | Takenaka et al. ............. | 180/219 |
| 2010/0032225 | A1 * | 2/2010 | Oohashi et al. ............... | 180/219 |
| 2010/0065362 | A1 * | 3/2010 | Shimura et al. ............... | 180/219 |
| 2011/0073398 | A1 * | 3/2011 | Yokoyama et al. ........... | 180/219 |
| 2011/0073399 | A1 * | 3/2011 | Seki ............................. | 180/219 |
| 2011/0100742 | A1 * | 5/2011 | Shibata et al. ................ | 180/219 |
| 2011/0120796 | A1 * | 5/2011 | Kuramochi et al. .......... | 180/219 |
| 2012/0199408 | A1 * | 8/2012 | Hayashi et al. ............... | 180/219 |

FOREIGN PATENT DOCUMENTS

JP    2008-213630 A    9/2008

* cited by examiner

*Primary Examiner* — Joseph M Rocca
*Assistant Examiner* — Gabriela C Craciun
(74) *Attorney, Agent, or Firm* — Birch, Stewart, Kolasch & Birch, LLP

(57) ABSTRACT

A fuel supply structure for a saddle-ride type vehicle wherein fuel supplied from a fuel tank to a fuel injection valve is supplied via fuel supply parts supported by a body frame having a single main frame extending rearwardly in a vehicle body from a head pipe with a pendent part being curved and extending downwardly in the vehicle body at a rear end of the main frame. Center frames extend in a lateral direction of the vehicle body from a halfway part in a vertical direction of the vehicle body of the pendent part and being provided with frame overhanged parts extending diagonally downwardly and extending further downwardly. The fuel supply parts are provided in an inside space enclosed by the center frames and the pendent part and in an overhanged part upside space on the upsides of the frame overhanged parts.

15 Claims, 7 Drawing Sheets

FUEL SUPPLY STRUCTURE OF SADDLE-RIDE TYPE VEHICLE

CROSS-REFERENCE TO RELATED APPLICATIONS

The present application claims priority under 35 USC 119 to Japanese Patent Application No. 2012-065928 filed Mar. 22, 2012 the entire contents of that are hereby incorporated by reference.

BACKGROUND OF THE INVENTION

1. Field of the Invention

The present invention relates to fuel supply structure of an internal combustion engine. More particularly, to a fuel supply structure of a saddle-ride type vehicle.

2. Description of Background Art

In an internal combustion engine, the enhancement of the performance of a fuel supply part is desired according to the recent flexibility of fuel. More particularly, an enhancement with respect to the performance of a fuel filter for filtering impurities in fuel is desired according to the use of an alcohol fuel. More especially, some saddle-ride type vehicles such as a motorcycle house a fuel filter in a fuel pump. See, for example, JP-A No. 2008-213630.

To make a fuel filter that is usable with alcohol fuel in fuel supply structure, for example, it is desired that the fuel filter should be a large-size. Further, the fuel filter should be provided in a state wherein it is easily maintained.

However, when the fuel filter is provided in an integral structure with the fuel pump described in JP-A No. 2008-213630, for example, the fuel pump is large in size to provide a large-size fuel filter that can correspond to the flexibility of fuel. In addition, when the fuel filter is separately provided, the installation of the large-sized fuel filter also has a problem wherein a sufficient installation space cannot be secured in the saddle-ride type vehicle such as a motorcycle wherein it is difficult to secure the installation and location of the fuel filter.

SUMMARY AND OBJECTS OF THE INVENTION

The present invention is made in view of the above-mentioned situation. An object of an embodiment of the present invention is to provide a fuel supply structure of a saddle-ride type vehicle wherein even if a fuel supply part, especially a fuel filter is large-sized, the arrangement space for the fuel filter can be secured and an excellent maintainability is obtained.

To achieve the object, according to an embodiment of the present invention, a fuel supply structure of a saddle-ride type vehicle is provided wherein fuel supplied from a fuel tank to a fuel injection valve is supplied via a fuel supply parts supported by a body frame and connected via a fuel hose wherein the body frame is provided with a single main frame extending rearwardly in a vehicle body from a head pipe with a pendent part curved and extending downward in the vehicle body being provided to a rear end of the main frame. Center frames extend laterally in the vehicle body from a halfway part in a vertical direction of the vehicle body of the pendent part that are provided with frame overhanged parts extending diagonally downwardly for connecting with lower pipes. The fuel supply parts are provided in an inside space enclosed by the center frames and the pendent part and in overhanged part upside space on the upsides of the frame overhanged parts.

According to an embodiment of the present invention, the regulator and the fuel pump are provided as the fuel supply parts. The fuel filter and the regulator are arranged abreast in positions wherein the center frame on one side is held between the fuel filter and the regulator in a longitudinal direction of the vehicle body in a side view of the vehicle body.

According to an embodiment of the present invention, a regulator and a fuel pump are provided as the fuel supply parts. The fuel filter and the regulator are attached to the center frame on one side with the fuel pump being attached to the center frame on the other side. Further, the fuel hose for connecting the fuel pump and the fuel filter is substantially horizontally attached to the fuel pump and the fuel filter.

According to an embodiment of the present invention, the fuel supply parts are arranged inside outermost ends in a lateral direction of the vehicle body of the center frames in a top view of the vehicle body.

According to an embodiment of the present invention, the fuel hose is flexible.

According to an embodiment of the present invention, the fuel filter and the regulator are arranged as a filter unit housed in a cover member that integrally covers the fuel filter and the regulator and the cover member is attached to the outside of the center frame on one side in the vehicle body.

According to an embodiment of the present invention, as a large space configured by the inside space enclosed by the pendent part extending downwardly in the vehicle body at a rear end of the main frame and the center frames extend laterally from the halfway part of the pendent part in a central part of the vehicle body and the overhanged part upside space formed on the upsides of the frame overhanged parts of the center frames can be formed, the fuel supply parts can be arranged in the space and even if the fuel supply parts are large in size, the fuel supply parts can be reasonably provided.

According to an embodiment of the present invention, as the fuel filter and the regulator are closely arranged, the fuel hose that connects both can be reduced, the handling of the fuel hose is easy, and the maintainability of the fuel filter and the regulator can be enhanced.

According to an embodiment of the present invention, as the fuel supply parts can be dispersively attached to the center frames extending in a lateral direction of the vehicle, the fuel supply parts can be arranged without being biased on one side in the lateral direction of the vehicle body with the fuel supply parts dispersed. Thus, an effective utilization of the inside space formed inside the center frames and the overhanged part upside space formed on the upsides of the center frames can be achieved. In addition, the vehicular balance can be enhanced. Further, the fuel hose for connecting the fuel pump and the fuel filter is substantially horizontally attached to the fuel pump and the fuel filter. If a high pressure is applied to the fuel hose, the fuel hose is not required to be greatly inclined and to be forcedly bent. Thus, the handling of the fuel hose is facilitated.

According to an embodiment of the present invention, in view of the fact that a body cover member can be made slim in the lateral direction of the vehicle body by locating the fuel filter, the regulator and the fuel pump that are respectively the fuel supply parts inside the outermost ends of the center frames in the lateral direction of the vehicle body. Thus, a straddle in seating is facilitated and ride comfort can be enhanced.

According to an embodiment of the present invention, as all the fuel hoses that are a fuel supply route and for connecting a group of the fuel filter, the regulator and the fuel pump and the fuel injection valve are flexible, a work space can be secured by bending the fuel hoses without removing them in the maintenance of peripheral parts of the throttle body. Thus, maintainability is enhanced.

According to an embodiment of the present invention, the fuel filter and the regulator can be simultaneously attached/detached to/from the vehicle body easily because the fuel filter and the regulator are united. Further, the cover member for housing the fuel filter and the regulator is attached to the outside of the center frame. The detachment is also easy with an excellent maintainability of the cover member. Further, the number of fixing parts can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
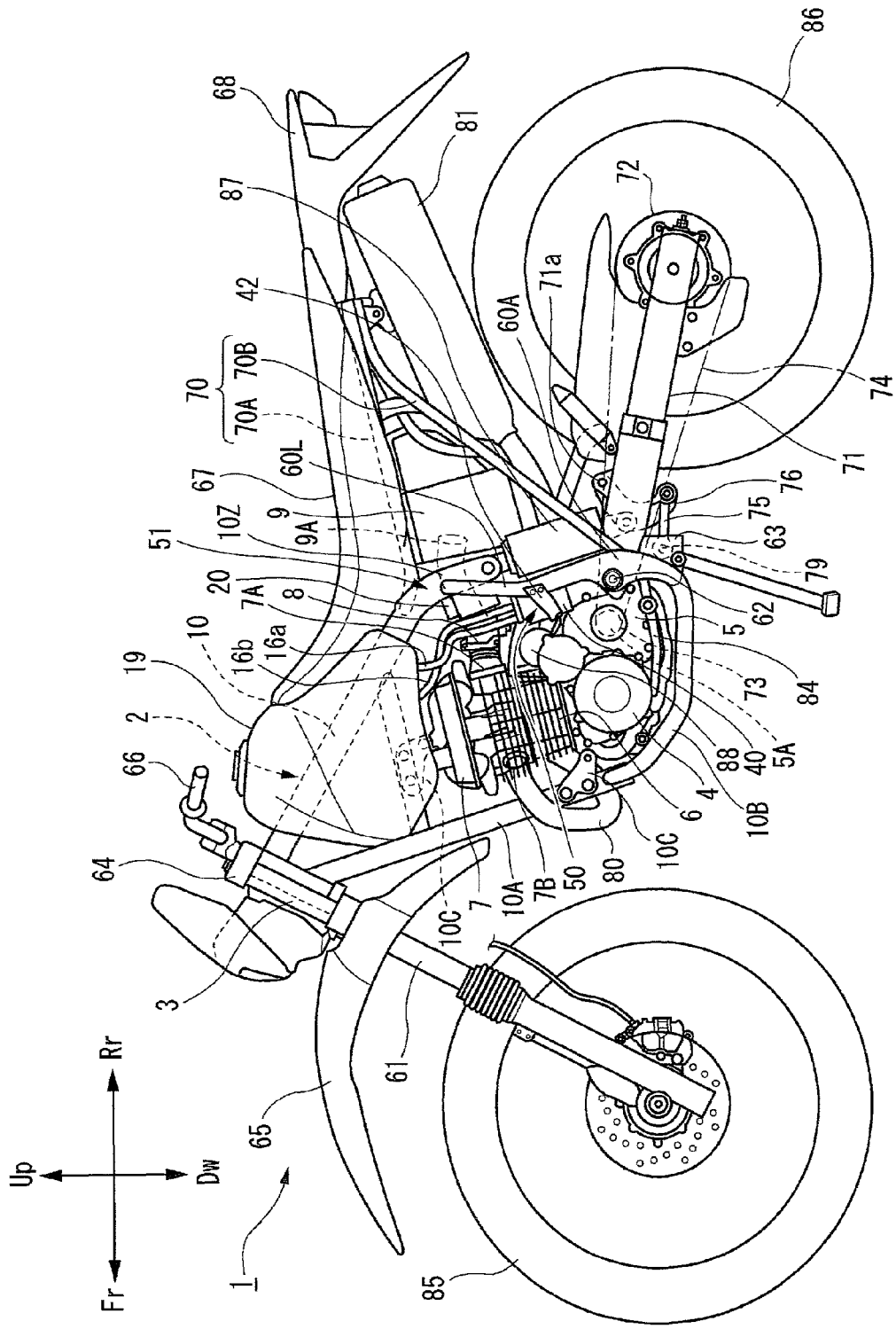
FIG. 1 is a left side view showing a motorcycle equivalent to one embodiment of the present invention.

One embodiment of the present invention will be described below.

Referring to the drawings, a motorcycle that is equivalent to this embodiment and that is suitable for use off road as one example of a saddle-ride type vehicle will be described below.

In the description of this embodiment, the description of a direction such as a longitudinal direction, a lateral direction and a vertical direction in this application shall be a direction of a vehicle body of the motorcycle. In addition, the attached drawings shall be viewed in a direction of reference signs in the drawings, so as to the description of directions in the drawings, Fr points to the front side of the vehicle body, Rr points to the rear side of the vehicle body, Up points to the upside of the vehicle body, Dw points to the downside of the vehicle body, R points to the right side of the vehicle body, and L points to the left side of the vehicle body.

In FIG. 1, to facilitate the description, a body cover member such as a side cover and a shroud that covers the outside of the vehicle body is suitably omitted.

As shown in FIG. 1, a body frame 2 of the motorcycle 1 is provided with one main frame 10 extending rearwardly and diagonally downwardly in the vehicle body from a head pipe 3 in the front of the vehicle body. A down tube 10A extends downwardly in the vehicle body from the head pipe 3 on the downside of the main frame 10 with a pair of right and left lower pipes 10B for connecting the downside of the down tube 10A that extend rearwardly on the downside of the vehicle body and a pair of left and right center frames 60L, 60R (60L on the left side and 60R on the right side) overhanged laterally in the vehicle body to couple a pendent part 10Z extending downward in the vehicle body with the pendent part bent at a rear end of the main frame 10 and respective rear ends of the lower pipes 10B. The body frame 2 configures a highly-rigid cradle type frame. An engine 4 is suspended via engine hangers 10C and others on the inside enclosed by the body frame 2 under a fuel tank 19.

An upper pipe 70A and a lower pipe 70B that respectively configure a rear frame 70 extend rearwardly in the vehicle body and are attached to the main frame 10 and the center frames 60L, 60R. The rear frame 70 is configured by a pair of right and left upper pipes 70A extending rearwardly in the vehicle body from the rear of the main frame 10 and a pair of right and left lower pipes 70B extending rearwardly and diagonally upwardly in the vehicle body from lower parts of the center frames 60L, 60R and respective rear ends of the upper pipe 70A and the lower pipe 70B are coupled. In addition, a seat 67, a rear fender 68 and a side cover not shown are attached to the upper pipe 70A and the lower pipe 70B.

A pair of right and left front forks 61 for journaling a front wheel 85 is provided to the downside of the head pipe 3. In addition, a top bridge 64 to which an operation handlebar 66 is fixed is coupled to the upside of the head pipe 3. In addition, a front fender 65 is attached to the downside of the head pipe 3 with the front fender covering the upside of the front wheel 85.

Each center frame 60L, 60R is provided with a curved part 60A on its downside. A pivot 62 for laterally piercing the vehicle body is provided to the curved part 60A. A front end of a swing arm 71 that journals a rear wheel 86 is vertically swingably supported by the pivot 62. In addition, a drive chain 74 is wound on a sprocket 72 provided to the rear wheel 86 and a sprocket 73 provided to an output shaft 5A of the engine 4 with the driving force of the engine 4 being transmitted to the rear wheel 86 via the drive chain 74.

In addition, a cross member 79 that laterally couples the center frames 60L, 60R is provided to the downside of the curved part 60A and a bracket 63 on the frame side is attached to the center in a direction of the width of the cross member 79. In the meantime, a supporting part 71a is provided to an upper part of the swing arm 71 and a link 76 is attached to the supporting part 71a. In addition, as for the link 76, for example, one end is attached to the supporting part 71a with its base curved downward being attached to the downside of a rear shock absorber 87. Further, a lower end of the link 76 is attached to the bracket 63 on the frame side via a rod 75. Accordingly, the rod 75 suitably inhibits the motion in a turning direction of the link 76 with a connecting fulcrum of the link and the supporting part 71a of the swing arm 71 as a reference.

Further, a gear change pedal 84 for a rider to put his/her foot is provided in the vicinity of a lower part of the engine 4 (on the side of space between the engine 4 and the center frame 60) in front of the curved part 60A.

The engine 4 is provided with a crankcase 5, a cylinder block 6 extended substantially upwardly from the front of the crankcase 5 and a cylinder head 7 coupled to an upper part of the cylinder block 6. In the cylinder block 6, a piston is reciprocatingly housed in a cylinder. In addition, a crankshaft coupled to the piston via a connecting rod and the output shaft 5A of the engine are journaled to the crankcase 5, and in the crankcase, a clutch mechanism, a shift mechanism and others that respectively configure a power transmission mechanism between the crankshaft and the output shaft 5A are housed. In addition, a starting motor 88 is arranged at the back of the engine 4 and on the front sides of the center frames 60L, 60R so as to enable rotation of the crankshaft by the starting motor 88.

In the cylinder head 7, an intake and exhaust valve that opens and closes an intake and exhaust passage that communicates with the cylinder in the cylinder block 6 is housed with an intake port 7A of the intake and exhaust passage being formed at the back of the cylinder head 7. A throttle body 8 is coupled to the intake port 7A and an air cleaner box 9 is coupled to the throttle body 8 via an intake passage 9A.

An exhaust port 7B of the intake and exhaust passage is formed at the front of the cylinder head 7. An exhaust pipe 80 is connected to the exhaust port 7B. The exhaust pipe 80 extends forward from the exhaust port 7B, is curved on the right side of the cylinder head 7, and extends rearwardly of the vehicle. An exhaust muffler 81 is coupled to an extended end of the exhaust pipe.

A fuel tank 19 is arranged over the cylinder head 7 and in front of the seat 67. In addition, a fuel pump 40 for feeding fuel in the fuel tank 19 to the throttle body 8 is attached under the fuel tank 19 and in the substantial center in a vertical direction of the left center frame 60L (see FIGS. 2 and 4). Further, a cover member 20 that holds fuel supply parts such as a fuel filter 11 and a regulator 14 respectively provided between the fuel pump 40 and the throttle body 8 is attached to the right center frame 60R under the fuel tank 19 (see FIGS. 2 and 3).

Figure 2:
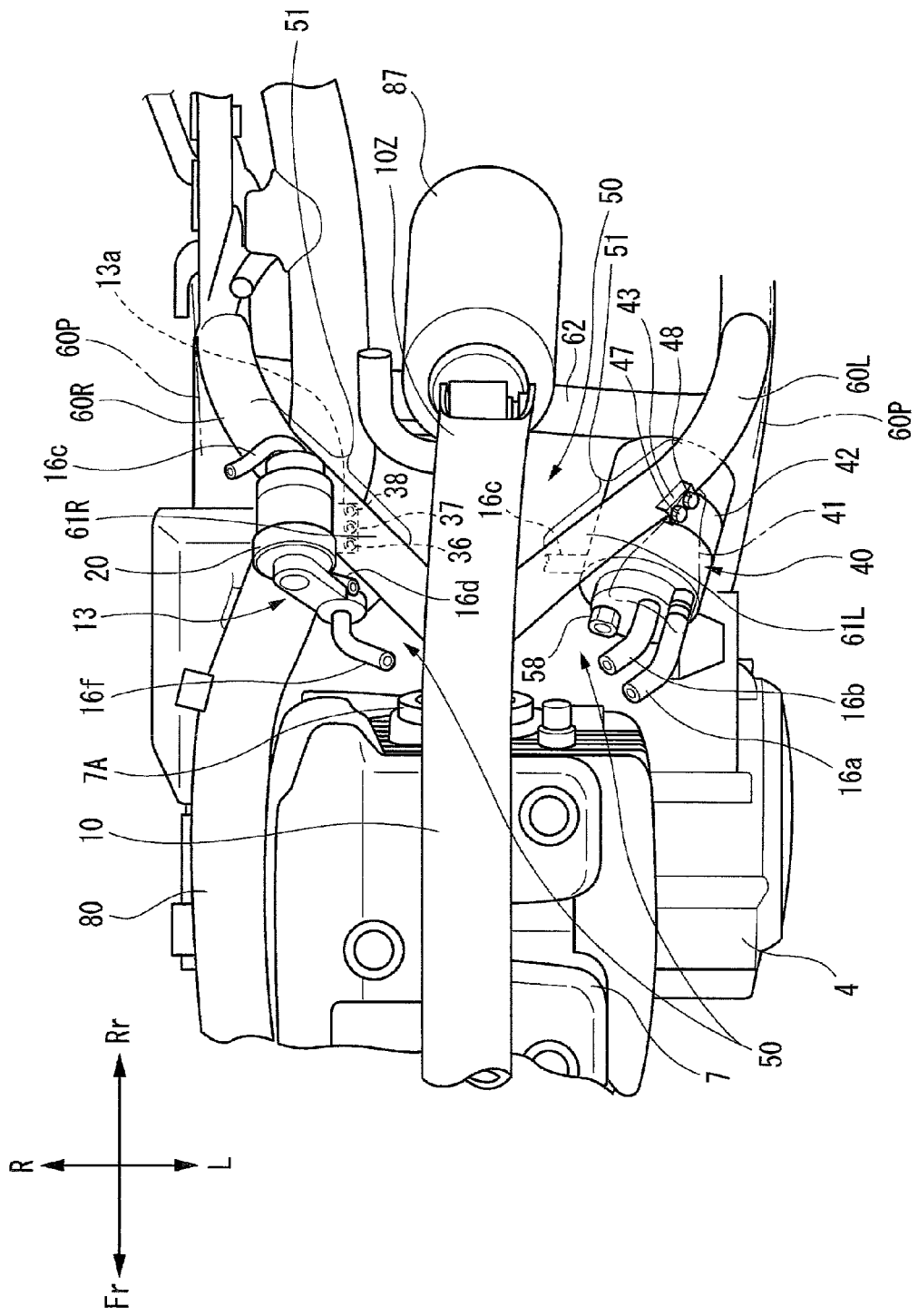
FIG. 2 is a schematic plan showing the motorcycle shown in FIG. 1 when the motorcycle is viewed from the upside of a body frame from that an upper pipe of a rear frame extended rearwardly in a vehicle body from a main frame is omitted.
Figure 3:
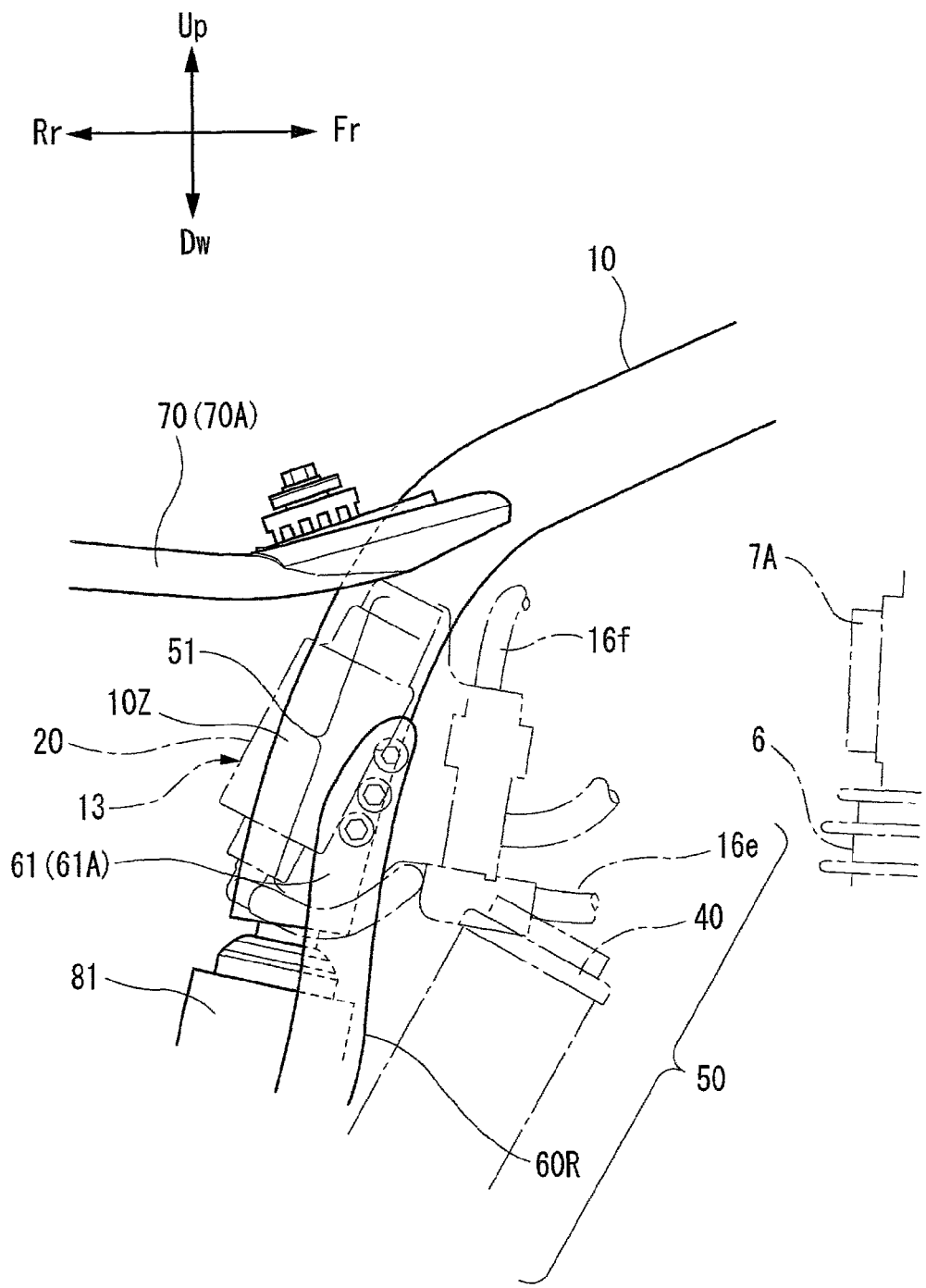
FIG. 3 is a schematic right side view showing a main part for explaining installation space of fuel supply parts in the motorcycle shown in FIG. 1.
Figure 4:
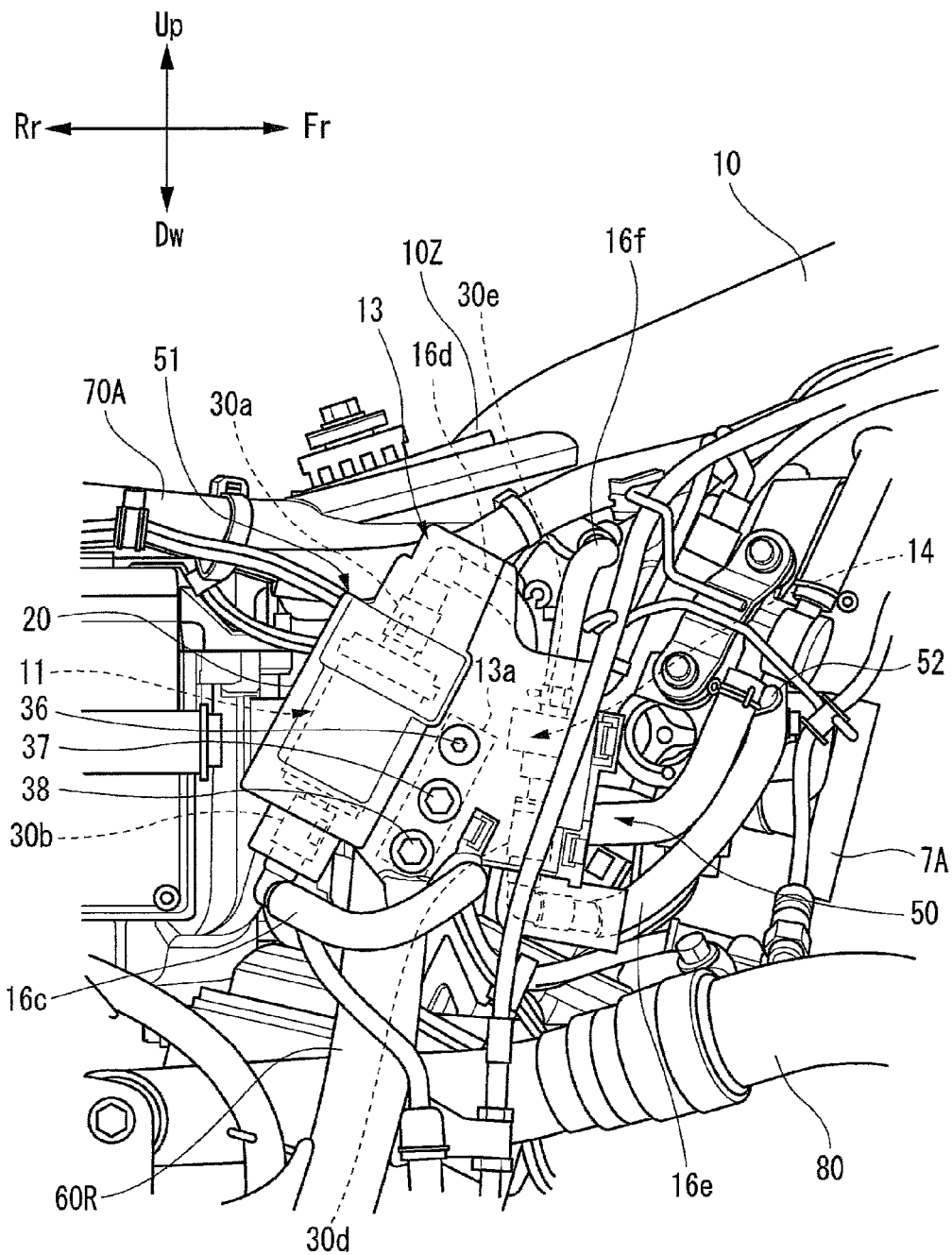
FIG. 4 is a schematic enlarged side view showing the main part when the motorcycle shown in FIG. 1 is viewed from the right side.
Figure 5:
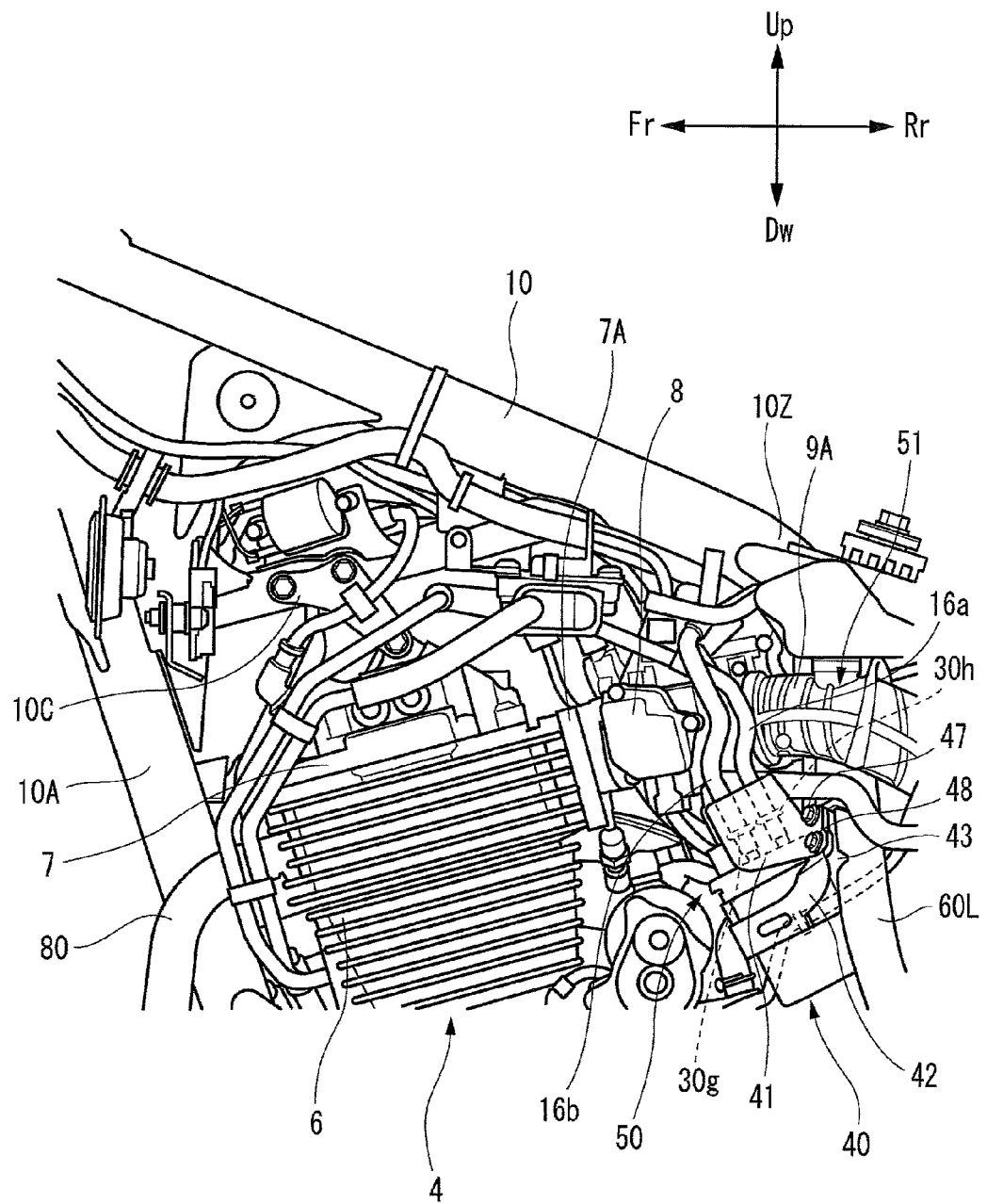
FIG. 5 is a schematic enlarged side view showing the main part when the motorcycle shown in FIG. 1 is viewed from the left side.
Figure 6:
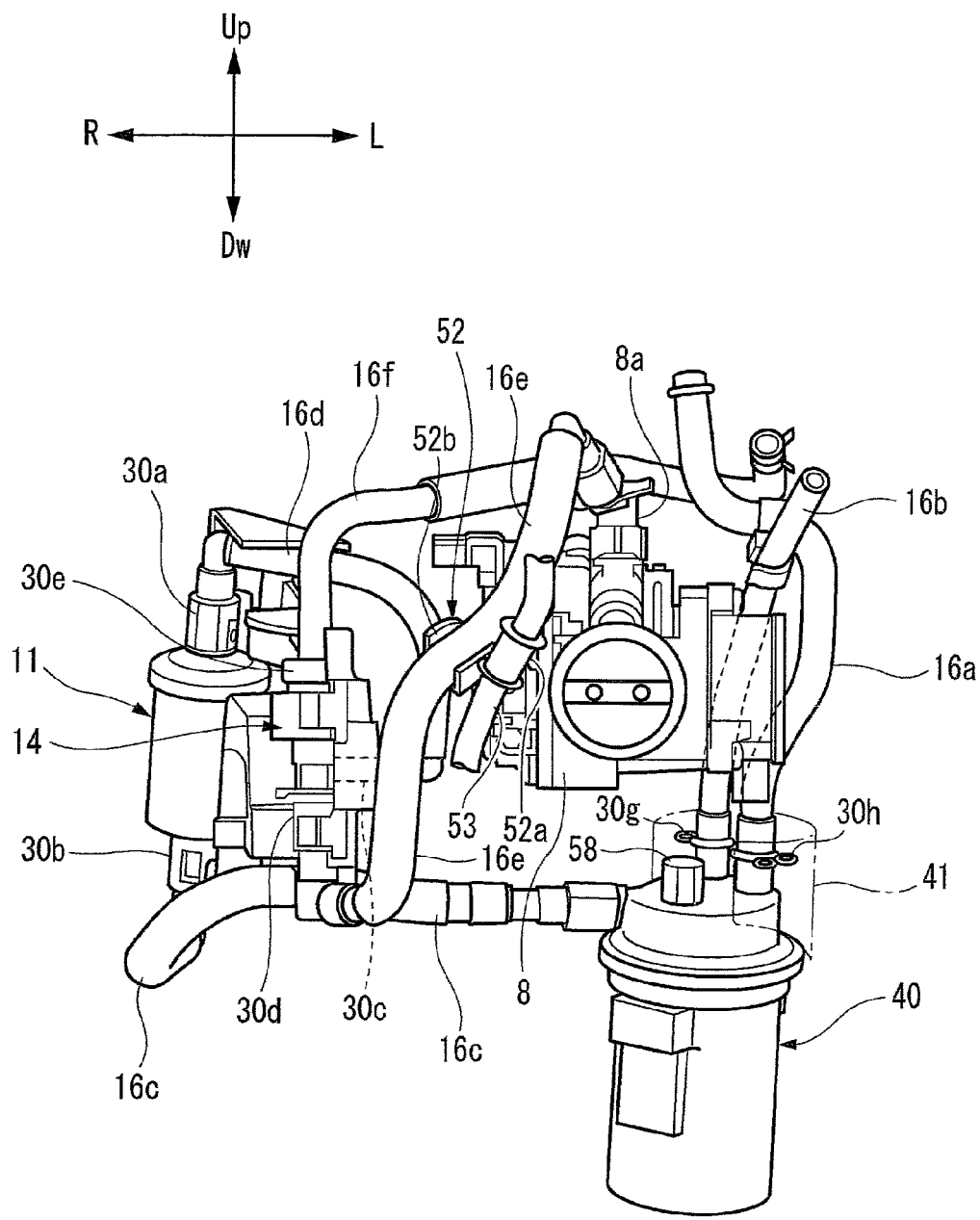
FIG. 6 is a schematic diagram showing the main part of the fuel supply parts for explaining connection of a fuel hose and arrangement of the fuel supply parts in the motorcycle shown in FIG. 1.

FIG. 2 is a plan showing the motorcycle 1 that is shown in FIG. 1, that is viewed from the upside and from that the fuel tank 19, the body cover member and the upper pipe 70A of the rear frame 70 extending rearwardly in the vehicle from the main frame 10 are omitted. In FIG. 2, a fuel hose 16 and its peripheral member are suitably omitted. FIG. 3 is a schematic right side view showing a main part for explaining the arrangement space of the fuel supply parts in this embodiment. FIG. 4 is a schematic enlarged view showing the vicinity of the center frame 60R when the motorcycle 1 shown in FIG. 1 is viewed from the right side and FIG. 5 is a schematic enlarged view showing the vicinity of the center frame 60L when the motorcycle 1 shown in FIG. 1 is viewed from the left side. FIG. 6 is a schematic diagram showing a main part of a fuel passage and the connection of the fuel supply parts in this embodiment.

The main frame 10 and the center frames 60L, 60R in this embodiment will be further described below.

As shown in FIGS. 1 to 3, the main frame 10 longitudinally extends in the center in a direction of vehicle width with the rear of the main frame being curved and extending downwardly in the vehicle to be the pendent part 10Z. Further, the two center frames 60L, 60R overhanging laterally in the vehicle body extend from a halfway part of the pendent part 10Z curved downwardly. More specifically, the center frames 60L, 60R extend downwardly and rearwardly, forming frame overhanged parts (61L, 61R) extending laterally of the vehicle, have a shape slightly overhanged forward (a substantially "dogleg" shape in a side view (see FIG. 1)) in the vicinity of each middle, and lower ends connect with the pair of right and left lower pipes 10B. An upper end of the rear shock absorber 87 is attached to the rear end of the main frame 10 slightly extending rearwardly across the center frames 60L, 60R and the rear shock absorber 87 is arranged in the substantial center of the vehicle body with the rear shock absorber being tilted on the front side of the vehicle body.

As described above, as the main frame 10 has a structure that extends downwardly relative to the vehicle body with the center frames 60L, 60R extending laterally relative to the vehicle from the halfway part of the curved pendent part 10Z. Thus, a predetermined space is secured on the inside and on the upside of each center frame 60L, 60R. More specifically, the above-mentioned predetermined space is configured by inside space 50 enclosed by the pair of center frames 60L, 60R overhanging laterally relative to the vehicle and a lower part of the pendent part 10Z located slightly at the back of both center frames 60L, 60R in the longitudinal direction of the vehicle and overhanging part of an upside space 51 (see FIG. 3) secured among the frame overhanged parts 61L, 61R with an upper part (upside parts of locations in that the frame overhanged parts 61L, 61R being provided) of the pendent part 10Z and the upper pipe 70A.

As described above, as large space configured by the inside space 50 and the overhanging part upside space 51 can be formed in the center in the vehicle body by the pendent part 10Z extending downwardly in the vehicle body with the center frames 60L, 60R extending on both sides in the lateral direction from the halfway part of the pendent part at the rear end of the main frame 10. With this arrangement the fuel supply parts such as the fuel filter 11, the fuel pump 40 and the regulator 14 can be arranged in the space. More particularly, a large-sized fuel filter 11 arranged outside the fuel tank 19 can be also easily provided. In addition, the inside space 50 and the overhanging part upside space 51 are located close to the engine 4 and the fuel tank 19 that are supplied with fuel. Thus, the space is suitable for arranging the fuel supply parts.

In addition, the intake passage 9A that connects the throttle body 8 provided to the intake port 7A of the engine 4 and the air cleaner box 9 can be arranged in the overhanged part upside space 51 between the frame overhanged part 61L and the upper pipe 70A (see FIG. 5).

In this embodiment, the main frame 10, the center frames 60L, 60R, the upper pipe 70A, the lower pipe 70B and the lower pipe 10B are cylindrically formed.

In this embodiment, as shown in FIG. 2, the exhaust pipe 80 led from the exhaust port 7B of the cylinder head 7 extends in the longitudinal direction of the vehicle body on the right side of the main frame 10. Though it is omitted in FIG. 2, the fuel injection valve 8a (see FIG. 6) is attached to the throttle body 8 at the back of the intake port 7A of the cylinder head 7 with the fuel pump 40 and a filter unit 13 being arranged with the throttle body 8 between them. More specifically, the filter unit 13 wherein the fuel filter 11 and the regulator 14 are incorporated in the cover member 20 is attached to the right center frame 60R on the right side of the main frame 10 as shown in FIGS. 2 and 3 and the fuel pump 40 is attached to the left center frame 60L.

The fuel filter 11 is a secondary filter located on the downstream side of a primary filter described later in a fuel passage that can filter a smaller foreign matter than the primary filter. The fuel filter 11 is provided with a function that can securely filter a water soluble minute amount of foreign matter in alcohol fuel and others. In addition, the regulator 14 functions to regulate fuel pressure on the fuel injection valve 8a.

The filter unit 13 is attached to a stay 13a of the cover member 20 provided to the center frame 60R via fastening screws 36, 37, 38. The filter unit 13 is slightly diagonally arranged so that its rear is located slightly close to the front of the vehicle body on the upside of the center frame 60R and its front is located in front of and inside the center frame 60R. More specifically, the filter unit 13 is arranged so that it is located in both the inside space 50 formed on the upside and on the inside of the center frame 60R and the overhanging part upside space 51 based upon the center frame 60R and the filter unit is arranged close to the engine 4.

As the fuel filter 11 and the regulator 14 are housed in the cover member 20 to be a unit as in this embodiment, the fuel filter 11 and the regulator 14 can be simultaneously attached/detached to/from the vehicle body. Thus, the number of fixing parts can be reduced, and handling is easy. Further, as the cover member 20 is attached to the outside of the center frame 60R, it can be also easily detached, and the cover member is excellent in maintainability.

In this embodiment, the fuel pump 40 is arranged on the left side of the main frame 10 as shown in FIGS. 1, 2 and 5. More specifically, the fuel pump 40 is fixed to a stay 43 of the center frame 60L in the middle part of the center frame 60L together with a protective cover 41 via a bracket 42 by fastening screws 47, 48. The fuel pump 40 is attached in front of the center frame 60L, at the back of the cylinder block 6 and inside the center frame 60L and is arranged in the inside space 50 in the present invention. As described above, the fuel pump 40 is arranged close to the engine 4 utilizing the inside space 50 formed by curving the center frame 60L with the center frame overhanging in the direction of the width of the vehicle.

Figure 7:
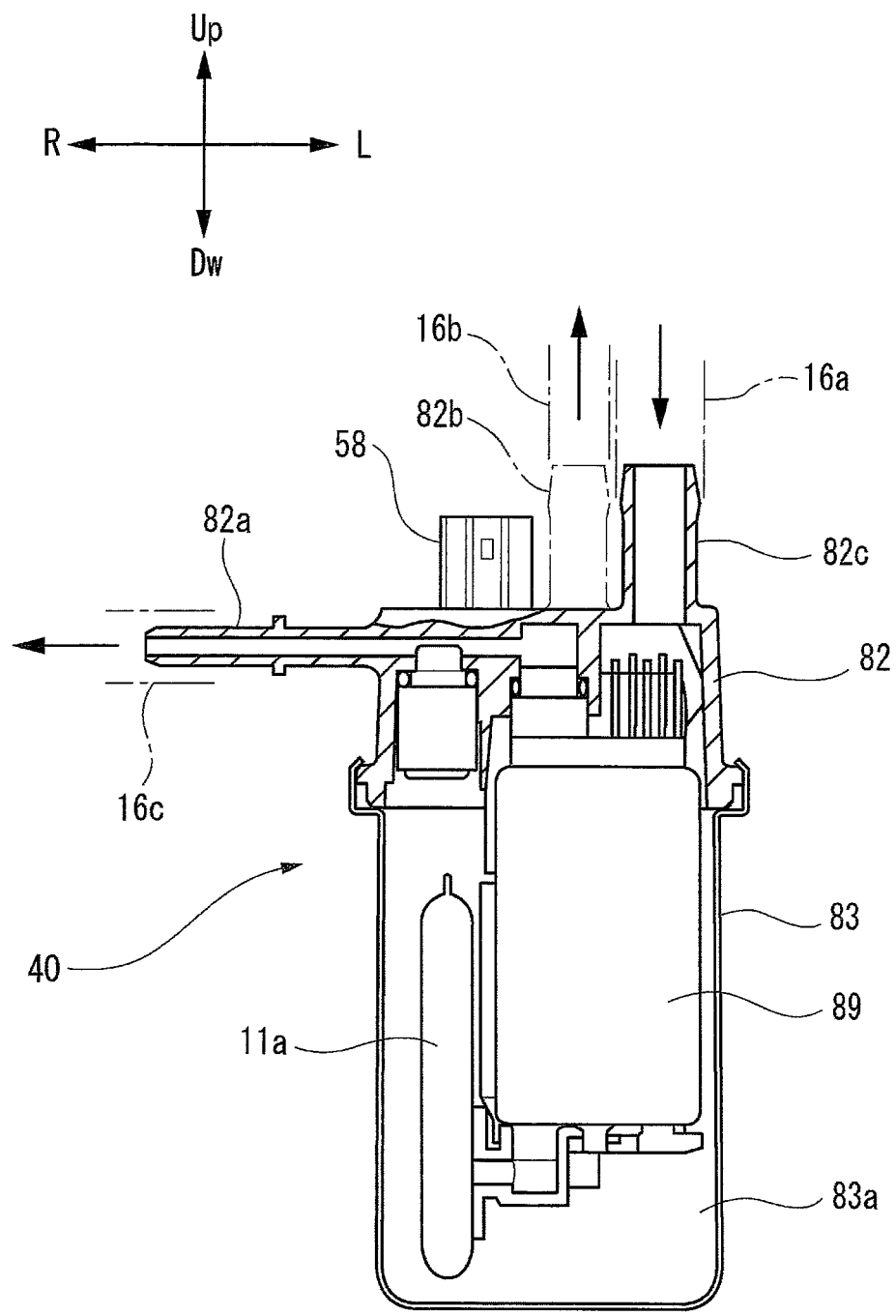
FIG. 7 is a schematic sectional view showing a fuel pump in the motorcycle shown in FIG. 1.

Next, the fuel pump 40 in this embodiment will be described. The fuel pump 40 is configured by a cap 82 and a housing 83 attached to a downside peripheral edge of the cap 82 by caulking as shown in FIG. 7. The cap 82 is provided with a joint 82a that laterally protrudes wherein the fuel hose 16c is attached and joints 82b, 82c that protrude upwardly and to which the fuel hose 16a and the fuel hose 16b are respectively attached. In addition, a connector 58 for supplying power to the fuel pump 40 protrudes upwardly from an upper part of the cap 82. In addition, a pump body 89 and an in-pump fuel filter 11a that is a primary filter attached on the side of the pump body 89 are housed in a fuel chamber 83a formed by the cap 82 and the housing 83.

Owing to such a configuration, fuel stored in the fuel chamber 83a is sucked up by the pump body 89 via the in-pump fuel filter 11a, is fed to the above-described fuel filter 11 that is the secondary filter through the fuel hose 16c, and further, is supplied from the fuel injection valve 8a into the throttle body 8 via the regulator 14.

Fuel in the fuel tank 19 is sucked into the fuel chamber 83a through the fuel hose 16a by quantity fed by the pump body 89. Accordingly, a certain extent of fuel is stored in the fuel pump 40 and the fuel pump also fulfills a function as an auxiliary tank of fuel.

In addition, in this embodiment, the fuel filter 11, the regulator 14 and the fuel pump 40 that are respectively the fuel supply parts are arranged inside the outermost ends 60P in the lateral direction of the vehicle body of the center frames 60L, 60R in a top view in that the vehicle body is viewed from the upside as shown in FIG. 2.

As described above, as the fuel filter 11, the regulator 14 and the fuel pump 40 are located inside the outermost ends 60P in the lateral direction of the vehicle body of the center frames 60L, 60R, the body cover member (not shown) that suitably covers the outside of the vehicle body can be made slim in the lateral direction. Thus, the ease of a straddle in seating is enhanced, and ride comfort can be enhanced.

Referring to FIG. 6, the arrangement of the fuel supply parts and the connection of the fuel hose 16 in this embodiment will be further detailedly described below. FIG. 6 shows arranged positions of the fuel supply parts viewed from the front side of the vehicle.

The fuel pump 40, the fuel filter 11, the regulator 14 and the fuel injection valve 8a are connected via the flexible fuel hose 16 (individually shown as 16a, 16b, 16c, 16d, 16e, 16f in FIG. 6) and fuel in the fuel tank 19 is supplied to the fuel injection valve 8a.

As shown in FIG. 6, the fuel hoses 16a, 16b extending to the fuel tank 19 located on the upside of the fuel pump 40 are provided to an upper end of the fuel pump 40 as described above. More specifically, the fuel pump 40 sucks fuel from the fuel tank 19 via the fuel hose 16a, while the fuel hose 16b (the breather tube) that returns fuel from the fuel pump 40 to the fuel tank 19 is connected to the fuel pump. In addition, in the fuel pump 40, the fuel hose 16c extending laterally (rightward in the vehicle body) is connected to the side of a lower end of the fuel filter 11. The fuel hose 16d is connected to the side of an upper end of the fuel filter 11 and is connected to the side of the regulator 14. The fuel hose 16e connected to the downside of the regulator 14 is connected to the fuel injection valve 8a provided to the throttle body 8 and the fuel hose 16f that returns excess fuel to the fuel tank 19 for the regulation of fuel pressure is connected to the regulator.

In addition, in this embodiment, as shown in FIG. 6, a throttle cable guide member 52, provided with a cable guide 52a that guides a throttle cable 53, is provided with a fuel hose guide 52b. More specifically, the throttle cable guide member 52 holds the throttle cable 53 and the fuel hose 16e that feeds fuel from the regulator 14 to the fuel injection valve 8a. As described above, according to the throttle cable guide member 52 that simultaneously holds the fuel hose 16e and the throttle cable 53, the number of the parts of the guide member can be reduced and the layout of the fuel hose and the cable can be simplified.

In addition, in this embodiment, as the fuel filter 11 and the regulator 14 are attached to the center frame 60R on one side and the fuel pump 40 is attached to the center frame 60L on the other side, the fuel supply parts can be attached to the left and right center frames 60L, 60R in the vehicle with the fuel supply parts being dispersed. Thus, the fuel supply parts can be uniformly arranged without being one-sided in the vehicle body, effectively utilizing the inside space 50 and the overhanging part upside space 51, and vehicular balance can be enhanced. Further, as the fuel hose 16c that connects the fuel pump 40 and the fuel filter 11 and to which high pressure is applied is substantially horizontally arranged (see FIG. 6), the fuel hose 16c is not required to be greatly inclined and is not also required to be forcibly bent. Thus, the layout of the fuel hose can be enhanced.

Further in addition, in this embodiment, as shown in FIG. 4, the fuel filter 11 and the regulator 14 are arranged alongside in positions where the center frame 60R is held between them in the longitudinal direction in the vehicle body in a side view wherein the vehicle body is viewed from the side. As described above, as the fuel filter 11 and the regulator 14 are closely arranged, the fuel hose 16d can be shortened and workability when the fuel filter 11 and the regulator 14 are simultaneously maintained is enhanced.

In this embodiment, a fuel hose locking member 30 (30a, 30b, 30c, 30e, 30g, 30h) is provided to joints of the fuel filter 11 and the regulator 14 to the fuel hose 16 as means for locking connected ends and even if fuel feed pressure by the fuel pump 40 is high, the connection can be maintained.

Though the description of the details of the fuel hose locking member 30 is omitted, any type such as a so-called pushing fitting type in that fitting/locking is made by pushing or a clip band type in that the periphery of the hose is tightened may be also adopted.

Further, in this embodiment, as shown in FIGS. 2 to 5, as the fuel supply parts such as the fuel pump 40, the fuel filter 11 and the regulator 14 are located inside the center frames 60R, 60L or on the upsides of the center frames 60R, 60L, the fuel supply parts are arranged close to the fuel tank 19 and the throttle body 8. Accordingly, as the fuel supply parts are connected via the fuel hose 16 (16a, 16b, 16c, 16d, 16e, 16f) of short length (distance), the fuel pump 40 can fully fulfill a function for sucking fuel from the fuel tank 19 and for feeding fuel.

Furthermore, in this embodiment, the cover member 20 can be detached from the vehicle body by removing the above-described fastening screws 36, 37, 38 in a state wherein the fuel filter 11 and the regulator 14 are covered and the fuel hose 16 is connected. As described above, as the cover member 20 can be detached from the vehicle body in the state wherein the fuel filter 11 and the regulator 14 are covered and the fuel hose 16 connected to the fuel filter 11 and the regulator 14 is made of flexible rubber or flexible synthetic resin, the fuel filter 11 and the regulator 14 can be suitably moved with the fuel hose 16 connected. Accordingly, the fuel supply parts or their peripheral parts can be easily maintained. In addition, as the fuel hose 16 is not removed, maintenance work can be performed without contaminating its circumference by a leak of fuel.

Further, as all fuel hoses 16 are flexible, a work space can be secured by bending the fuel hose without removing the fuel hose 16 when the throttle body 8 provided in the intake passage 9A to the engine 4 is maintained for example and maintainability is enhanced.

One embodiment of the present invention has been described, however, in the present invention, a curved shape of the pendent part 10Z of the main frame 10 and the shapes of the center frames 60L, 60R in the above-mentioned embodiment are not limited to these. The inside space 50 or the overhanged part upside space 51 has only to be formed.

In addition, in the above-mentioned embodiment, the fuel filter 11 and the regulator 14 are united, however, the structure of the fuel filter and the regulator is not necessarily limited to such structure.

Further, in the above-mentioned embodiment, the case of the motorcycle has been described, however, the fuel supply structure of the saddle-ride type vehicle according to the present invention can be applied to another saddle-ride type vehicle such as a three-wheeled vehicle or a four-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A fuel supply structure of a saddle-ride vehicle wherein fuel supplied from a fuel tank to a fuel injection valve is supplied via fuel supply parts supported by a body frame and connected via a fuel hose, comprising:
said body frame being provided with a single main frame extending rearwardly from a head pipe;
wherein the main frame extends along a longitudinal centerline of the vehicle, and includes a rear portion that is curved and that extends downwardly to form a pendent part,
the body frame is provided with left and right center frames that extend from the pendent part, said left and right center frames extending from a location of the pendent part that is substantially halfway along the pendent part in a vertical direction of the vehicle,
the left and right center frames forming overhanged parts, the left and right center frames respectively having an upper portion, a middle portion, and a lower portion, the upper portion extends laterally and downwardly, the middle portion is located below the upper portion and extends rearwardly, and the lower portion extends forwardly to connect with a respective pair of left and right lower pipes; and
said fuel supply parts are provided in an inside space enclosed by the left and right center frames and the pendent part and in an overhanged part upside space on upsides of the frame overhanged parts.

2. The fuel supply structure of the saddle-ride vehicle according to claim 1, wherein the fuel supply parts include a fuel filter, a regulator and a fuel pump; and
the fuel filter and the regulator are arranged abreast in positions wherein the right center frame is held between them in a longitudinal direction of the vehicle in a side view of the vehicle.

3. The fuel supply structure of the saddle-ride vehicle according to claim 1, wherein the fuel supply parts include a fuel filter, a regulator, and a fuel pump;
the fuel filter and the regulator are attached to the right center frame;
the fuel pump is attached to the left center frame; and
another hose for connecting the fuel pump and the fuel filter is substantially horizontally attached to the fuel pump and the fuel filter.

4. The fuel supply structure of the saddle-ride vehicle according to claim 2, wherein the fuel supply parts include the fuel filter, the regulator and the fuel pump;
the fuel filter and the regulator are attached to the right center frame;
the fuel pump is attached to the left center frame; and
another fuel hose for connecting the fuel pump and the fuel filter is substantially horizontally attached to the fuel pump and the fuel filter.

5. The fuel supply structure of the saddle-ride vehicle according to claim 1, wherein the fuel supply parts are arranged inside outermost ends in a lateral direction of the vehicle of the center frames in a top view of the vehicle.

6. The fuel supply structure of the saddle-ride vehicle according to claim 2, wherein the fuel supply parts are arranged inside outermost ends in a lateral direction of the vehicle of the center frames in a top view of the vehicle.

7. The fuel supply structure of the saddle-ride vehicle according to claim 3, wherein the fuel supply parts are arranged inside outermost ends in a lateral direction of the vehicle of the center frames in a top view of the vehicle.

8. The fuel supply structure of the saddle-ride vehicle according to claim 1, wherein the fuel hose is flexible.

9. The fuel supply structure of the saddle-ride vehicle according to claim 2, wherein the fuel hose is flexible.

10. The fuel supply structure of the saddle-ride vehicle according to claim 3, wherein the fuel hose is flexible.

11. The fuel supply structure of the saddle-ride vehicle according to claim 5, wherein the fuel hose is flexible.

12. The fuel supply structure of the saddle-ride vehicle according to claim 2, wherein the fuel filter and the regulator are arranged as a filter unit housed in a cover member that integrally covers the fuel filter and the regulator; and the cover member is attached to the outside in the vehicle of the center frame on one side.

13. The fuel supply structure of the saddle-ride vehicle according to claim 3, wherein a fuel filter and the regulator are arranged as a filter unit housed in a cover member that integrally covers the fuel filter and the regulator; and the cover member is attached to the outside in the vehicle of the center frame on one side.

14. The fuel supply structure of the saddle-ride vehicle according to claim 5, wherein a fuel filter and the regulator are arranged as a filter unit housed in a cover member that integrally covers the fuel filter and the regulator; and the cover member is attached to the outside in the vehicle of the center frame on one side.

15. The fuel supply structure of the saddle-ride vehicle according to claim 8, wherein a fuel filter and the regulator are arranged as a filter unit housed in a cover member that integrally covers the fuel filter and the regulator; and the cover member is attached to the outside in the vehicle of the center frame on one side.

* * * * *